US011853459B2

(12) United States Patent
Taron et al.

(10) Patent No.: US 11,853,459 B2
(45) Date of Patent: Dec. 26, 2023

(54) CONCEALING SENSITIVE INFORMATION IN TEXT

(71) Applicant: Microsoft Technology Licensing, LLC, Redmond, WA (US)

(72) Inventors: Michael Eugene Taron, Seattle, WA (US); Nadja Ayodele Rhodes, Seattle, WA (US); David Conger, Issaquah, WA (US); Allison Jane Rutherford, Seattle, WA (US); Eric Boone Thompson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 307 days.

(21) Appl. No.: 16/017,867

(22) Filed: Jun. 25, 2018

(65) Prior Publication Data

US 2019/0392176 A1    Dec. 26, 2019

(51) Int. Cl.
*G06F 21/62* (2013.01)
*G06N 20/00* (2019.01)
*G06F 3/16* (2006.01)
*G06F 21/32* (2013.01)

(52) U.S. Cl.
CPC .......... *G06F 21/6254* (2013.01); *G06F 3/167* (2013.01); *G06F 21/32* (2013.01); *G06N 20/00* (2019.01)

(58) Field of Classification Search
CPC ...... G06F 21/6254; G06F 3/167; G06F 21/32; G06N 20/00
See application file for complete search history.

(56) References Cited

U.S. PATENT DOCUMENTS

| | | | |
|---|---|---|---|
| 3,000,453 A1 | 8/2011 | Cooper et al. | |
| 9,875,369 B2 | 1/2018 | Libin | |
| 9,898,619 B1* | 2/2018 | Hadsall | G06F 21/60 |
| 2007/0143857 A1* | 6/2007 | Ansari | H04N 21/25833 |
| | | | 726/26 |
| 2009/0141895 A1* | 6/2009 | Anderson | G06F 21/84 |
| | | | 380/252 |
| 2010/0205667 A1* | 8/2010 | Anderson | G06F 21/62 |
| | | | 726/19 |

(Continued)

OTHER PUBLICATIONS

"International Search Report and Written Opinion Issued in PCT Application No. PCT/US2019/036219", dated Sep. 20, 2019, 13 Pages.
"Amazon Macie FAQ", Retrieved from: https://web.archive.org/web/20171124111530/https:/aws.amazon.com/macie/faq/, Nov. 24, 2017, 5 Pages.
"Keep your notes secure with password-protection", Retrieved from: https://support.apple.com/en-in/HT205794, Feb. 26, 2018, 4 Pages.

(Continued)

*Primary Examiner* — Oleg Korsak

(57) ABSTRACT

Systems, methods, and software are disclosed herein for presenting sensitive information in accordance with a level of concealment. In an implementation, an object is identified comprising text that includes sensitive information. A contextual privacy setting for the sensitive information and a context surrounding a presentation of the object is then identified. Based on the contextual privacy setting and the context surrounding the presentation of the object, a level of concealment for the sensitive information in the text is determined. The object comprising the text is then presented, wherein the sensitive information included in the text is revealed in accordance with the level of concealment.

20 Claims, 9 Drawing Sheets

(56) References Cited

U.S. PATENT DOCUMENTS

| | | | |
|---|---|---|---|
| 2013/0254874 A1* | 9/2013 | Xu | G06F 21/6209 726/17 |
| 2014/0078164 A1* | 3/2014 | Chan | H04N 5/33 345/589 |
| 2014/0208418 A1* | 7/2014 | Libin | G06F 21/6209 726/19 |
| 2014/0372877 A1 | 12/2014 | Snyder et al. | |
| 2015/0113666 A1* | 4/2015 | Buck | G06F 21/554 726/28 |
| 2015/0302621 A1 | 10/2015 | Liu et al. | |
| 2016/0210473 A1* | 7/2016 | Cohen | G06F 21/10 |
| 2017/0040002 A1* | 2/2017 | Basson | G06F 21/84 |
| 2017/0206370 A1 | 7/2017 | Bahrs et al. | |
| 2017/0289079 A1* | 10/2017 | Cudak | H04L 67/306 |
| 2018/0020001 A1 | 1/2018 | White et al. | |
| 2018/0122371 A1 | 5/2018 | Vangala et al. | |

OTHER PUBLICATIONS

"Laverna", Retrieved from: https://laverna.cc/ , Retrieved on: May 3, 2018, 5 Pages.

"Pingar", Retrieved from: http://pingar.com/sensitive-information-identification/, Retrieved on: May 3, 2018, 7 Pages.

Cumby, et al., "A Machine Learning Based System for Semi-Automatically Redacting Documents", In Proceedings of Twenty-Third Innovative Applications of Artificial Intelligence Conference, Aug. 9, 2011, pp. 1628-1635.

Sanchez, et al., "Detecting sensitive information from textual documents: an information-theoretic approach", In Proceedings of 9th international conference on Modeling Decisions for Artificial Intelligence, Nov. 21, 2012, 12 Pages.

"Office Action Issued in European Patent Application No. 19733364. 4", dated Oct. 20, 2023, 7 Pages.

* cited by examiner

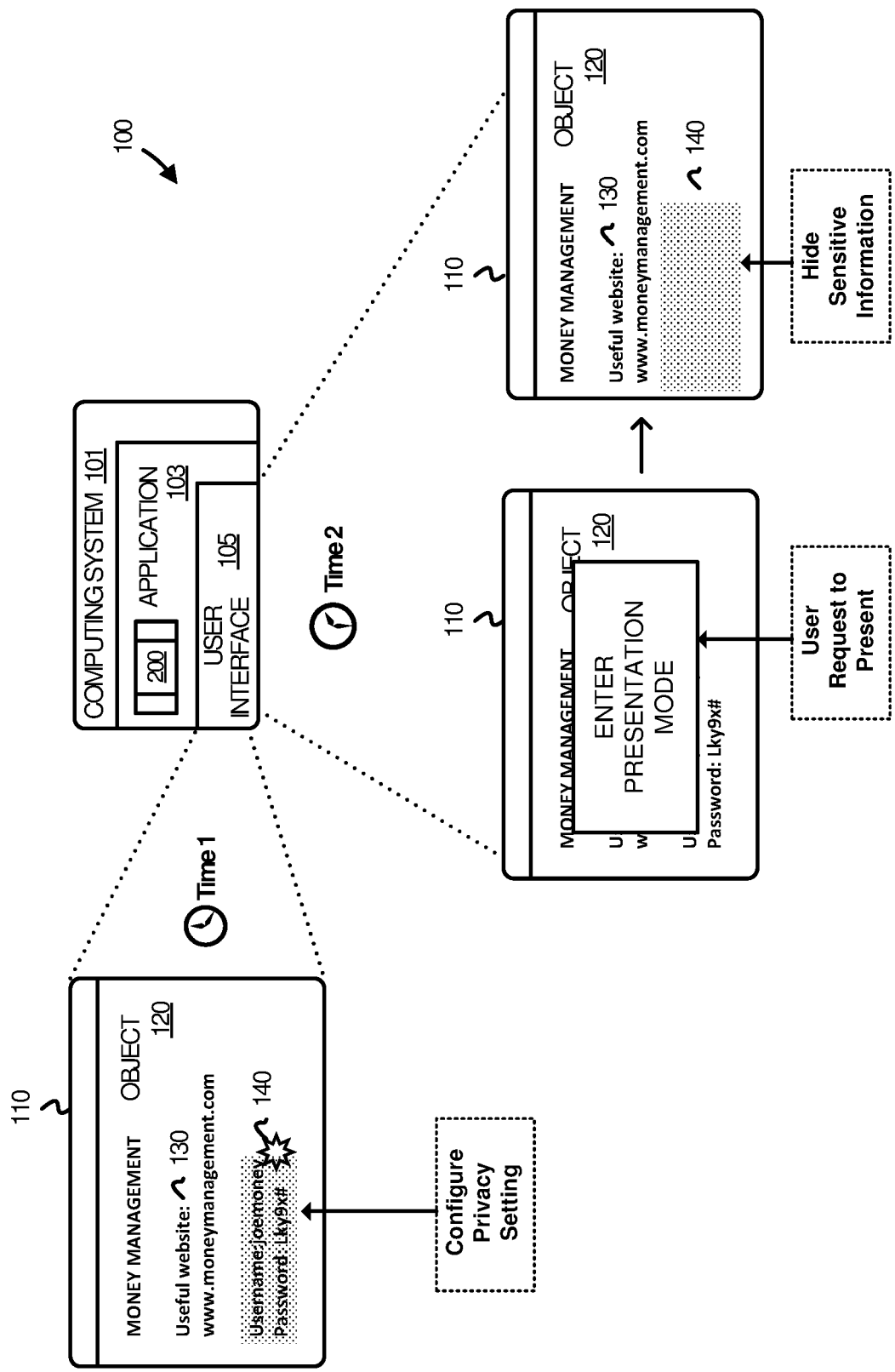

300

| Access Network | User | Display Mode | Concealment Level |
|---|---|---|---|
| 301 | 302 | 303 | 304 |
| Private | User A | Isolated Screen | Low |
| | | Screen Share | Mild |
| Public | User B | Audible | High |
| | - | - | High |
| | | - | High |

Confidential Product Information

FIGURE 3

CONCEALING SENSITIVE INFORMATION IN TEXT

TECHNICAL FIELD

Aspects of the disclosure are related to computing hardware and software technology, and in particular to reveal sensitive information included in text in accordance with a concealment level.

TECHNICAL BACKGROUND

Many software applications provide users with the ability to create and recall documents and digital notes. These software applications include related utilities that offer user-interface techniques to insert and store various user information. The user information may in some scenarios include user sensitive information, such as passwords and credit card numbers. When accessing the user information stored in the previously created documents and digital notes, the user may not want this sensitive information to be visibly or audibly presented to the user along with the rest of the information, especially when the user is not in a secure environment. Additionally, a user sharing their documents or digital note pad with other users or among other devices may not want to share the user sensitive information with other users or on unsecured devices and networks.

To display the user information in an unsecure environment, a user may generally be required to manually parse the documents or digital note pad to identify the user sensitive data and delete or obfuscate the characters of the user sensitive information. Even if the user sensitive data is identified, the user may not be able to dynamically allocate which environments are secure enough to present the user sensitive information to the user. Furthermore, there may be certain users and devices that may be authorized to view or overhear user sensitive information, while other users and devices may not. Unfortunately, the software applications used for presenting user content in a document or digital note do not allow a user to dynamically allocate which environments the sensitive information may be included in text when presenting the contents of the document or digital note to a user.

Overview

An enhanced system, method, and software application is disclosed herein that improves the concealment of sensitive information included in text. In an implementation, an object is identified comprising text that includes sensitive information. A contextual privacy setting for the sensitive information and a context surrounding a presentation of the object is then identified. Based on the contextual privacy setting and the context surrounding the presentation of the object, a level of concealment for the sensitive information in the text is determined. The object comprising the text is then presented. The sensitive information included in the text is revealed in accordance with the level of concealment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an operational architecture for implementing an enhanced application to reveal sensitive information included in text in accordance with a concealment level.

FIG. 3 illustrates a data structure in an implementation of an enhanced application to reveal sensitive information included in text in accordance with a concealment level.

TECHNICAL DESCRIPTION

Figure 2B:
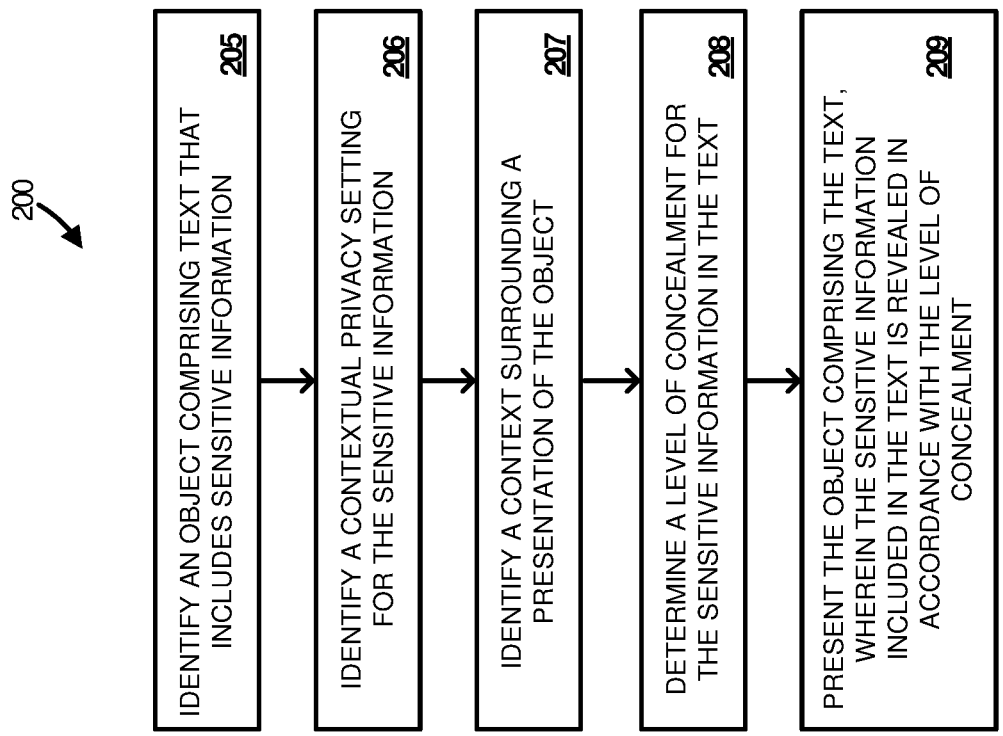
FIGS. 2A-2B illustrate a secure presentation process employed in implementations of an enhanced application to reveal sensitive information included in text in accordance with a concealment level.

Examples of the present disclosure describe an application for concealing sensitive information included in text. In an implementation, an object is identified comprising text that includes sensitive information. A contextual privacy setting for the sensitive information and a context surrounding a presentation of the object are then identified. Based on the contextual privacy setting and the context surrounding the presentation of the object, a level of concealment for the sensitive information in the text is determined. The object comprising the text is then presented. The sensitive information included in the text is revealed in accordance with the level of concealment.

A technical effect that may be appreciated from the present discussion is the increased efficiency in determining which information in an object is sensitive based on the type of environment the information is accessed in. For example, a user may not want some portions of text to be presented in an unsecure environment (e.g., audibly reciting the sensitive information, accessing the sensitive information over a public network or unsecure device, sharing text that includes the sensitive information with other users, etc.). Another technical effect that may be appreciated from the present discussion is the increased inefficiency in allowing a user to dynamically designate which types of information should be allocated as sensitive based on several factors making up the environment (e.g., user type, user identity, access network, presentation mode, synchronizing devices, etc.) The application described herein also improves the efficiency in allowing a third-party administrator to generate privacy settings for sensitive information which may be of interest to the third party (e.g., corporate security settings on what type of content may be accessed in an unsecure environment or shared with unauthorized users).

Further, examples herein described that prior to identifying the object comprising the text, user input is received comprising the text. The text is then identified for the sensitive information. Further in this example, the contextual privacy setting is configured for the sensitive information. The contextual privacy setting is then stored in association with the object comprising the text that includes sensitive information. In some scenarios, the text is examined for the sensitive information by identifying at least one of a keyword, a symbol, a user indication, or a formatting style associated with the sensitive information. In other scenarios, the text is examined for the sensitive information by tracking indicators associated with the sensitive information in a cloud-based data repository to be ingested by a machine learning system to identify the sensitive information.

In some scenarios, the context surrounding the presentation of the object may be identified based a request to share the object with at least one additional user or device. For example, the object may be accessed by displaying text from the object in a presentation mode or using a desktop screen sharing application. In other scenarios, the context surrounding the presentation of the object may be identified based on a request to audibly present the object to the user. For example, a digital sticky note comprising text may be requested to be read aloud by a user. In this example, the sensitive information may be determined to be omitted based on the determination that the digital sticky note is being presented in an unsecure environment.

In some implementations, the context surrounding the presentation of the object may be identified based on a request to access the object over an unsecure network. For example, an email being accessed using a public network at a coffee shop may be determined to be an unsecure environment to display confidential information in the message. In other implementations, the context surrounding the presentation of the object may be identified based on a request to access the object using at least one of a user configured fingerprint or facial recognition. For example, it may be determined that a digital note pad is being accessed in a secure environment when a user unlocks the device presenting the sensitive information using facial recognition technology.

In yet a further example, the sensitive information included in the text is revealed in accordance with the level of concealment by blurring the sensitive information, obfuscating the sensitive information, flipping over of a digital content card including the sensitive information, omitting the sensitive information. For example, if the level of concealment is high, the sensitive information may be hidden from view to the user by flipping over a digital content card on the user's home screen on a user device. If the level of concealment is low, such as when the user opens the object comprising the text with an authorized fingerprint, the sensitive information included in the text may be completely revealed to the user. In the other hand, the level of concealment may be determined to be medium. In this example, the sensitive information included in the text may be revealed to a specified degree, such as by distorting the sensitive information using blurring techniques, an alias, rearranged characters, obfuscation of the sensitive information, etc.

Referring to the drawings, FIG. 1 illustrates an exemplary operational architecture 100 related to processing operations for management of an exemplary enhanced system with which aspects of the present disclosure may be practiced. Operational environment 100 includes computing system 101 comprising application 103. Application 103 employs a secure presentation process 200 in the context of producing views in a user interface 105. User interface 105 displays objects comprising text that includes sensitive information produced by computing system 101.

Figure 9:
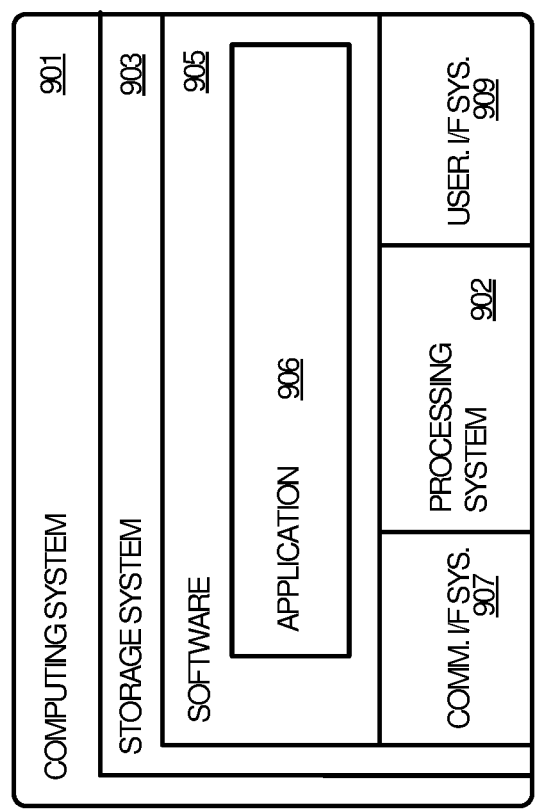
FIG. 9 illustrates a computing system suitable for implementing the technology disclosed herein, including any of the architectures, processes, operational scenarios, and operational sequences illustrated in the Figures and discussed below in the Technical Description.

Computing system 101 is representative of any device capable of running an application natively or in the context of a web browser, streaming an application, or executing an application in any other manner Examples of computing system 101 include, but are not limited to, personal computers, mobile phones, tablet computers, desktop computers, laptop computers, wearable computing devices, or any other form factor, including any combination of computers or variations thereof. Computing system 101 may include various hardware and software elements in a supporting architecture suitable for performing secure presentation process 200. One such representative architecture is illustrated in FIG. 9 with respect to computing system 901.

Application 103 includes a software application or application component capable of revealing sensitive information included in text based on a level of concealment in accordance with the processes described herein. Examples of the software application include, but are not limited to, note taking applications, document drafting applications, spreadsheet applications, presentation applications, messaging applications (e.g., email and text messaging), and any other type of combination or variation thereof. The software application may be implemented as a natively installed and executed application, a web application hosted in the context of a browser, a streamed or streaming application, a mobile application, or any variation or combination thereof.

User interface 105 includes representative view 110 that may be produced by application 103. Representative view 110 may present the object comprising the text. The sensitive information included in the text is revealed in accordance with the level of concealment. An end user may interface with application 103 using user interface 105 to view object comprising text including the sensitive information visual representation 110. The user may interface with application 103 over user interface 105 using an input instrument such as a stylus, mouse device, keyboard, touch gesture, as well as any other suitable input device. The user may initiate a command to add user input comprising the text which may be stored with a contextual privacy setting in association with the object that includes the sensitive information. The user may then initiate a command to access or view the stored object comprising the text which includes the sensitive information. In an enhancement, application 103 provides the ability for the user to initiate a command to allocate a portion of the text in the object as sensitive information. The user or a third-party (e.g., corporate administrator) may also initiate a command to allocate which types of environments are secure for each portion of text that includes the sensitive information.

Figure 2A:
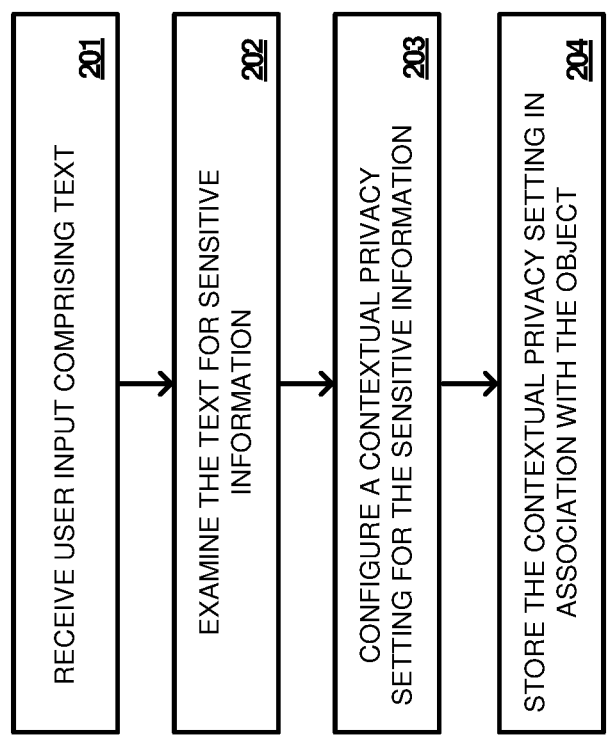

More particularly, FIGS. 2A-2B illustrate secure presentation process 200 which, as mentioned, may be employed by application 103 to reveal sensitive information included in text in accordance with a concealment level as described herein. Some or all of the steps of secure presentation process 200 may be implemented in program instructions in the context of a component or components to the application used to carry out the secure presentation feature. The program instructions direct computing system 101 to operate as follows, referring parenthetically to the steps in FIG. 2A in the context of FIG. 1.

FIG. 2A may be associated with representative view 110 at Time 1 in FIG. 1. In operation, application 103 receives user input comprising text 130 included in object 120 (step 201). Application 103 may receive user input comprising text 130 using an input instrument such as a stylus, mouse device, keyboard, touch gesture, as well as any other suitable input device. Object 120 may be a digital note page, a digital sticky note, a document, a spreadsheet, a presentation slide deck, an electronic message (i.e. text message or email message), or any other file item or formatted data which allows a user to input text 130. For example, a user may input text onto a virtual note. In this scenario, the virtual note may comprise object 120 and the text comprises text 130. Text 130 may comprise a variety of information which range in levels of sensitivity. For example, text 130 includes a title of virtual note 120 (i.e., Money Management), a webpage to visit which is related to the topic of virtual note 120, and a username and password to access a user portal on the webpage. In this example, the title and the webpage may not be allocated as sensitive information while the username and password are allocated as sensitive information.

Application 103 then examines text 130 for sensitive information 140 (step 202). Application 103 may examine text 130 for sensitive information 140 by identifying that a portion of text 130 contains a keyword or a symbol which indicate that the portion of text 130 comprises sensitive information 140. For example, application 103 may identify the words "username" and "password" to determine that the portion of text 130 following each of the keywords comprises sensitive information 140. In other scenarios, application 103 may examine text 130 for sensitive information 140 by identifying that a portion of text 130 contains a pattern or a formatting style indicating that the portion of text comprises sensitive information. For example, application 103 may determine that when numbers are in a pattern resembling the format of a social security number (e.g., 00-00-0000), the number is likely a social security number. In another example, application 103 may determine that a portion of text 130 containing a combination of letters, numbers, and symbols (e.g., Lky9x #), indicates that the portion of text 130 is likely a password. In some implementations, a user may input additional data which indicates which portions of text 130 comprise sensitive information 140. For example, a user may select/highlight a portion of text 130 and mark the portion as sensitive information to application 103.

In other scenarios, text 130 is examined for sensitive information 140 by tracking indicators associated with sensitive information 140 in a cloud-based data repository. The tracked indicators are then ingested by a machine learning system to identify sensitive information 140. The machine learning system may analyze text 130 in real-time or analyze text 130 at a later time to determine sensitive information 140. Computing system 101 may transfer object 120 including text 130 to be examined by the machine learning system. Computing system 101 may then receive data indicating which portions of text 130 comprise the sensitive information.

Alternatively, algorithms used in a machine learning environment may be transferred to computing system 101 and used locally by application 103 to examine text 130 for sensitive information 140. Advantageously, this may ensure that sensitive information 140 is not transferred to an external system before it is examined. In some scenarios, application 103 may be implemented, in part or in whole, as a natively installed and executed application, a web application hosted in the context of a browser, a streamed or streaming application, a mobile application, or any variation or combination thereof. Therefore, it should be noted that the examination may be performed by application 103 natively, by an application service external to computing system 101, or by a combination of a natively installed and executed application, a web application, a streamed application, a mobile application, etc.

In a next operation, application 103 configures a contextual privacy setting for the sensitive information 140 (step 203). The contextual privacy setting for sensitive information 140 may include categorizing sensitive information 140 into a type of sensitive information (e.g., confidential work information, private personal information, access restricted group information, etc.). The contextual privacy setting may also include a sensitivity measurement. For example, secret work-related information may be marked as highly sensitive information. However, the phone numbers of employees may be marked as mildly sensitive information. The contextual privacy setting may be determined by application 103 using a machine learning algorithm established using tracked contextual privacy settings for similar types of sensitive information. Application 103 may also determine the contextual privacy setting based on preferences associated with the types of sensitive information. For example, a highly confidential product name may be set as highly sensitive information by an administrator at a company.

Once the contextual privacy setting has been configured, application 103 stores the contextual privacy setting in association with object 120 comprising text 130 that includes sensitive information 140 (step 204). Application 103 may store the contextual privacy setting in association with object 120 by including a flag indicating that a portion of text 130 is sensitive, the type of sensitivity information that sensitivity information 140 comprises, and the level of sensitivity associated with sensitivity information 140. In some examples, the contextual privacy setting may be stored using metadata, key-value pairs, stings, or any other data associated with object 120, text 130, and/or sensitive information 140.

FIG. 2B may be associated with representative view 110 at Time 2 in FIG. 1. Referring parenthetically to the steps in FIG. 2B in the context of FIG. 1, application 103 identifies object 120 comprising text 130 that includes sensitive information 140 (step 205). Application 103 may identify object 120 in response to receiving a request to view text 130 included in object 120. For example, a user may request to open a virtual note while using a presentation mode on a user device. In another example a user may request that text 130 be read aloud to the user using a virtual assistant enabled smart speaker. In other scenarios, object 120 may be identified by application 103 in response to being attached in an email or text message. For example, a user may not request to view object 120 directly. However, object 120 may still be identified in response to the user selecting object 120 to share with other users. In some implementations, application 103 may identify object 120 in a passive mode, such as when a digital sticky note is displayed on a home screen of a computing device.

In a next operation, application 103 identifies the contextual privacy setting for sensitive information 140 (step 206). As previously discussed, the contextual privacy setting for sensitive information 140 may be indicated by metadata, key-value pairs, stings, or other data associated with object 120, text 130, and/or sensitive information 140. Application 103 may determine that sensitive information 140 is present in object 120, which portion of text 130 comprises sensitive information 140, and the type and level of sensitivity associated with sensitive information 140 based on flags or any other type of allocation method which allows application 103 to identify the contextual privacy setting for sensitive information 140.

Application 103 then identifies a context surrounding a presentation of object 120 (step 207). In some scenarios, the context surrounding the presentation of object 120 may be identified based a request to share object 120 with at least one additional user or device. For example, application 103 may be directed to share a screen displaying object 120 with additional user devices to be viewed by other users. Furthermore, the context surrounding a presentation of object 120 may be determined based on the identity of the additional users or device sharing the screen with computing system 101.

For example, if the screen displaying object 120 is shared with authorized users, the context surrounding the presentation of object 120 may be determined to be secure. Alternatively, a general instruction to display object 120 comprising text 130 in a universal presentation mode may indicate that the context surrounding the presentation of object 120 is not secure. Referring to FIG. 1, application 103 has been directed to display object 120 in a presentation mode which will likely be viewed by additional users. In other scenarios, application 103 may be directed to synchronize the latest version of object 120 with other devices which may be accessible to the user of computing device 101 or additional users.

In some implementations, the context surrounding the presentation of object 120 may be identified based on a request to audibly present object 120 to the user. For example, a digital sticky note comprising text 130 may be requested to be read aloud by a virtual assistant enabled smart speaker. In a further example, application 103 may also be directed to determine a number of additional users that are located within a proximate distance from computing system 101. For example, in addition to being directed to audibly recite text 130 of object 120, application 103 may be instructed to determine how many additional users will likely overhear the audible presentation of object 120. If too many additional users are located within a close enough proximity to computing device 101, the context surrounding the presentation of object 120 may be determined to be unsecure.

Application 103 may determine that additional users are located within the same proximity to computing system 101 based on the detection of additional voices generating audio input for computing system 101, the detection of additional computing systems (e.g., based on a signal strength), the detection of signals from Internet of Things (IoT) devices indicating a presence of additional users, or any other indicator that additional users are located near enough to computing device 101 to hear the audible recitation of text 130 in object 120. For example, application 103 may determine a number of additional users located within a close enough proximity to computing device 101 by detecting three additional voices using audio input data received in the area of computing device 101. In another example, application 103 may determine that ten additional users located within a close enough proximity to computing device 101 by receiving signaling and data from additional ten computing devices (e.g., detected personal hotspots, Bluetooth signaling, cellular network signaling, WIFI signaling, Global Positioning System (GPS) coordinates received from additional computing devices, etc.).

In some examples, the context surrounding the presentation of object 120 may be identified based on a request to access object 120 over a network type. For example, the context surrounding the presentation of object 120 may be identified to be not secure based on a request to remotely access object 120 and view text 130 over a public network. In another example, the context surrounding the presentation of object 120 may be identified to be secure based on a request to access object 120 over a work private network, but not a personal private network, and vice versa.

In other implementations, the context surrounding the presentation of object 120 may be identified based on a request to access object 120 using at least one of a user configured fingerprint, facial recognition, retinal scan, password, voice recognition, or some any other technique for verifying the identity of the user when accessing object 120. For example, it may be determined that a digital note pad is being accessed in a secure environment when a user unlocks computing device 101 presenting object 120 using facial recognition technology. In another example, the context surrounding the presentation of object 120 may be identified based on whether access to computing system 101, application 103, and/or object 120 requires an authentication method to be performed. For example, if application 103 requires a user to authenticate their voice to open object 120, application 103 may determine that the context surrounding the presentation of object 120 is secure.

In response to identifying the contextual privacy setting for sensitive information 140 and the context surrounding the presentation of object 120, application 103 determines a level of concealment for sensitive information 140 in text 130 (step 208). It should be noted that different contextual privacy settings may lead to different levels of concealment levels depending on the context surrounding the presentation of object 120. For example, object 120 may be associated with a low level of concealment when object 120 having a high sensitive contextual privacy setting is displayed in a secure context surrounding the presentation of object 120. On the other hand, when object 120 has a high sensitivity contextual privacy setting but is presented in an unsecure context surrounding, sensitive information 140 in text 130 may be completely hidden from view or omitted from audio presentations.

In some scenarios, the level of concealment may be indicative of a degree of concealment which should be applied to sensitive information 140 when included in text 130. For example, sensitive information 140 may be concealed only to a degree by blurring the sensitive information, rearranging characters, obfuscating the information, using an alias or codeword which represents the sensitive information, flipping over a virtual content card which includes sensitive information 140, etc. The level of concealment may be indicative of how sensitive information 140 should be displayed, which types of sensitive information 140 should be displayed, and which additional users may view/hear sensitive information 140. For example, a password stored in a digital sticky not which is opened using facial recognition of the user may be completely displayed to the user. Therefore, the level of concealment would be low. Alternatively, text comprising a confidential corporation name may have a high concealment level when accessed using an unauthorized user or when accessed on a public network.

In a final operation, application 103 presents object 120 comprising text 130, wherein sensitive information 140 included in the text 130 is revealed in accordance with the level of concealment (step 209). Sensitive information 140 may be revealed to the user in accordance with the level of concealment by blurring the sensitive information, obfuscating the sensitive information, flipping over of a digital content card including the sensitive information, or omitting the sensitive information. For example, a digital sticky note listing a username and password for the user may be displayed on a desktop screen for the user. If the level of concealment is high, the digital sticky note may be placed upside down to prevent additional users from viewing the sensitive information. In another example, when application 103 is directed to audibly present text 130 from object 120, application 103 may determine to omit sensitive information 140 when audibly presenting text 130 based on a determined high level of concealment.

FIG. 3 illustrates data structure 300, which is representative of a data structure to determine a concealment level associated with confidential product information for a company. As illustrated in FIG. 3, data structure 300 includes columns 301-304. In particular, column 301 includes an access network. A private access network may be associated with a high, medium, or low concealment level. However, access to the confidential product information using a public network will always yield a high concealment level. Column 302 includes a list of authorized users. For example, User A is authorized to view the confidential product information, so User A may have either a low or medium concealment level. Alternatively, User B is unauthorized. Therefore, even though User B is accessing the confidential product information using a private network, the concealment level for the confidential product information when accessed by User B is high.

In a next column, column 303 indicates the display mode for presenting the confidential product information to the user. For example, when User A accesses the confidential product information using an isolated screen, the concealment level associated with the confidential product information is low. When User A access the confidential product information using a shared screen environment, the concealment level associated with the confidential product information is mild. However, when User A accesses the confidential product information using an audible presentation method, the concealment level associated with confidential product information is high. Column 304 indicates the associated concealment level based on the contextual privacy setting for the confidential product information and the context surrounding the presentation of the confidential product information.

Figure 4:
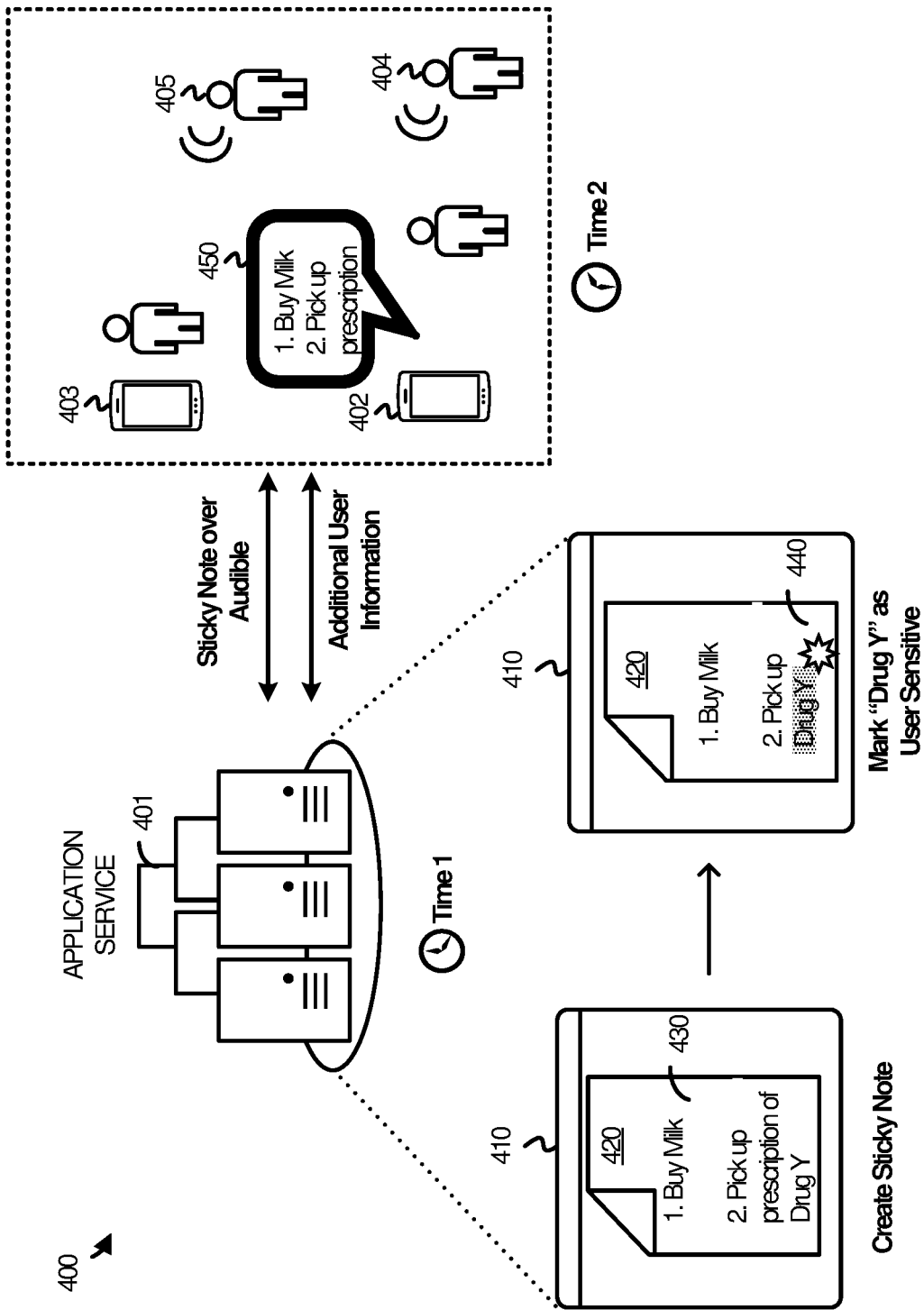
FIG. 4 illustrates an operational architecture in an implementation of an enhanced application to reveal sensitive information included in text in accordance with a concealment level.

FIG. 4 illustrates an exemplary operational architecture for revealing sensitive information included in text in accordance with a concealment level that may be used in one or more scenarios of the present technology. FIG. 4 illustrates an operational scenario 400 that relates to what occurs when a user requests that text from a digital note be audibly recited to the user. Operational scenario 400 includes application service 401, user interface 410, digital sticky note 420, text 430, and sensitive information 440. Operational scenario 400 also includes user device 402, user device 403, additional user 404, and additional user 405.

In operation, at Time 1, application service 401 receives user input comprising a text 430 included in digital sticky note 420. In this scenario, text 430 comprises a list of items (i.e., buy milk and pick up Drug Y). Once text 430 has been entered into digital sticky note 420, application service 401 examines text 430 for sensitive information 440. In this example scenario, the user has marked that the name of the prescription drug, Drug Y, should be examined as sensitive information. Based on this indication from the user, application service 401 configures a contextual privacy setting for sensitive information 440. The contextual privacy setting may be determined by the user at the time of marking sensitive information 440. However, in other scenarios, the contextual privacy setting may be determined by application service 401 based on prior user preferences, an administrative security setting, a machine learning algorithm, or some other method of determining the contextual privacy setting. Once the contextual privacy setting has been configured, application service 401 stores the contextual privacy setting in association with digital sticky note 420 comprising text 430 that includes sensitive information 440.

In a next operation, at Time 2, application service 401 identifies digital sticky note 420 comprising text 430 that includes sensitive information 440. In this example, the user of user device 402 requests that the digital sticky note be read aloud to the user using a virtual assistant enabled smart speaker. Application service 401 then identifies the contextual privacy setting for sensitive information 440. For example, application service 401 may determine that sensitive information 440 has a medium concealment level, and therefore, should only be audibly recited in a secure environment, omitted in an unsecure environment, and audibly recited using a codename or alias in a semi-secure environment.

Next, application service 401 identifies a context surrounding the audible presentation of digital sticky note 420. In this scenario, application service 401 requests additional user information from user device 402 to determine the context surrounding the audible presentation of digital sticky note 420. For example, user device 402 may detect a wireless signal from user 403 indicating that another user is likely present. Additionally, user device 402 may receive audio inputted voice data from additional users 404-405 indicating that additional users are likely in a close proximity to user device 402. Although not shown in FIG. 4, in some scenarios user device 402 may be further configured to determine an identity of the additional users based on an identifier of additional user devices, an identity associated with the voice of the additional users, an identifier associated with a facial recognition profile of the additional users, etc. User device 402 may then transfer the additional user information to application service 401 to determine the context surrounding the audible presentation of digital sticky note 420.

In response to identifying the contextual privacy setting for sensitive information 440 and the context surrounding the presentation of digital sticky note 420, application service 401 determines a level of concealment for sensitive information 440 in text 430. For example, application service 401 may determine that when audibly reciting text 430 in the semi-secure environment, sensitive information 440 should be audibly recited using a codeword. The codeword may be preconfigured by application service 401, identified using machine learning techniques, allocated by the user, preconfigured by a manufacturer of a user device, and the like. In this example, application service 401 further analyzes the number (and possibly the identity) of the additional users to determine whether sensitive information 440 should be audibly recited to the user of user device 402. In a final operation, user device 402 audibly presents digital sticky note 420 comprising text 420. In this example, sensitive information 440 included in text 430 is revealed to a degree to the user in accordance with the level of concealment. For example, the list of items from digital sticky note 420 is audibly recited to the user with the name "Drug Y" replaced with the alias "prescription".

Figure 5:
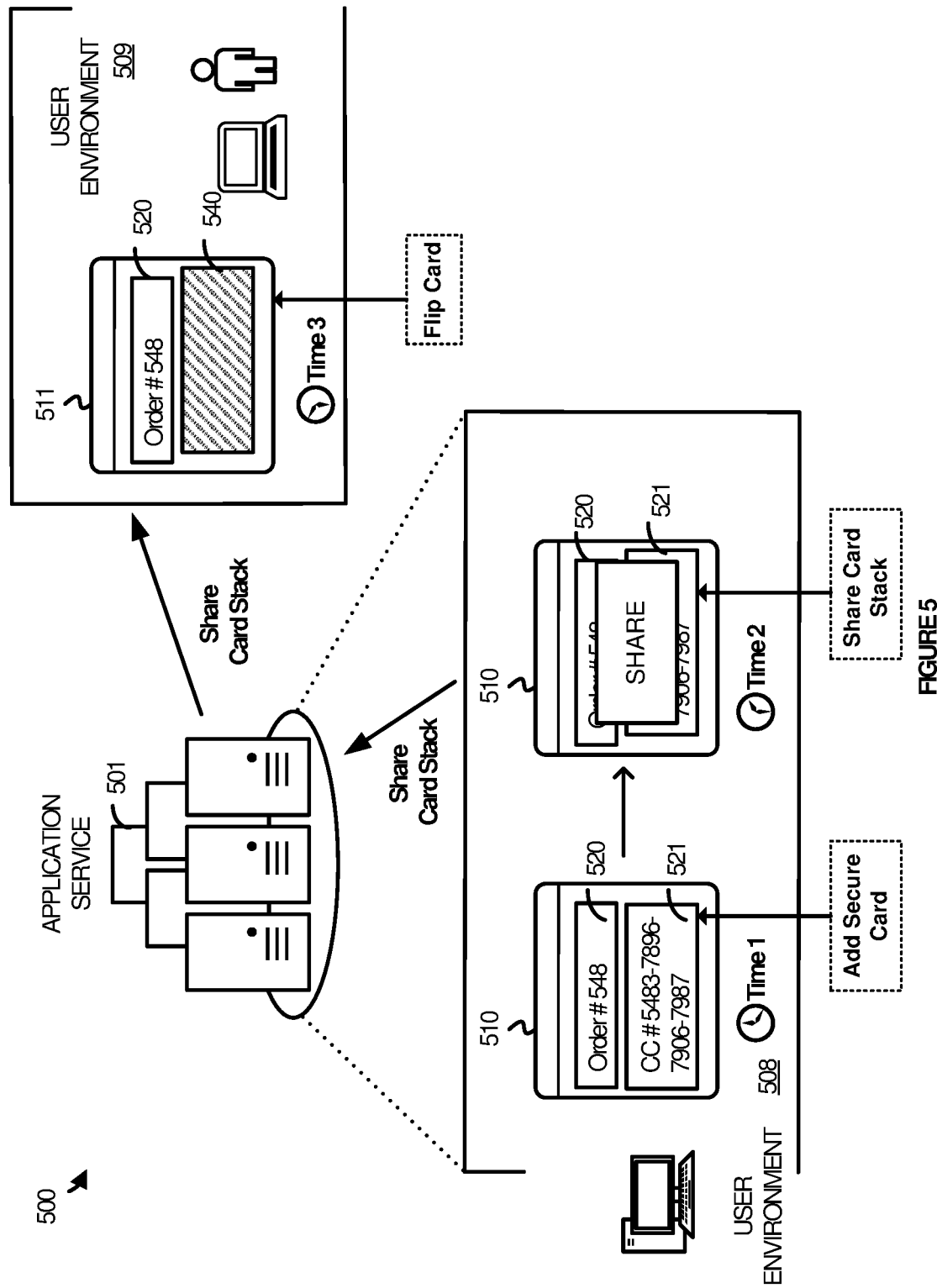
FIG. 5 illustrates an alternative operational architecture in an implementation of an enhanced application to reveal sensitive information included in text in accordance with a concealment level.

FIG. 5 illustrates an exemplary operational architecture for revealing sensitive information included in text in accordance with a concealment level that may be used in one or more scenarios of the present technology. FIG. 5 illustrates an operational scenario 500 that relates to what occurs when a stack of digital content cards is shared amongst other users. Operational scenario 500 includes application service 501, user environment 508, user interface 510, user environment 509, and user interface 511. Operational scenario 500 also includes digital content cards 520-521.

In operation, at Time 1, application service 501 receives user input comprising text included in digital content cards 520-521. In this example, digital content card 520 comprises text indicating an order number and digital content card 521 comprises text indicating a credit card number. Application service 501 then examines the text in each of digital content cards 520-521 for the sensitive information. In this example, application service 501 determines that digital content card 521 comprises sensitive information (i.e., a credit card number). In response, application service 501 configures a contextual privacy setting for the sensitive information in digital content card 521. Once the contextual privacy setting has been configured, application service 501 stores the contextual privacy setting in association with digital content card 521 comprising the sensitive information.

In a next operation, at Time 2, application service 501 identifies digital content card 521 comprising text that includes the sensitive information. In this example, application service 501 may identify digital content card 521 in response to receiving a request from the user in user environment 508 to share the stack of digital content cards 520-521 with the user in user environment 509. Next, application service 501 identifies the contextual privacy setting for the sensitive information and a context surrounding a presentation of digital content cards 521. For example, application service 501 may determine that the stack of digital content cards 520-521 is being shared with an unauthorized user. Therefore, in response to identifying the contextual privacy setting for the sensitive information and the context surrounding the presentation of digital content card 521, application service 501 determines a level of concealment for the sensitive information. In a final operation, at Time 3, application service 501 presents digital content cards 520-521 to a user in user environment 509. The sensitive information is revealed to the user in accordance with the level of concealment. In this example, digital content card 520 is completely revealed and digital content card 521 is flipped upside down when presented on user interface 511 in user environment 509.

Figure 6:
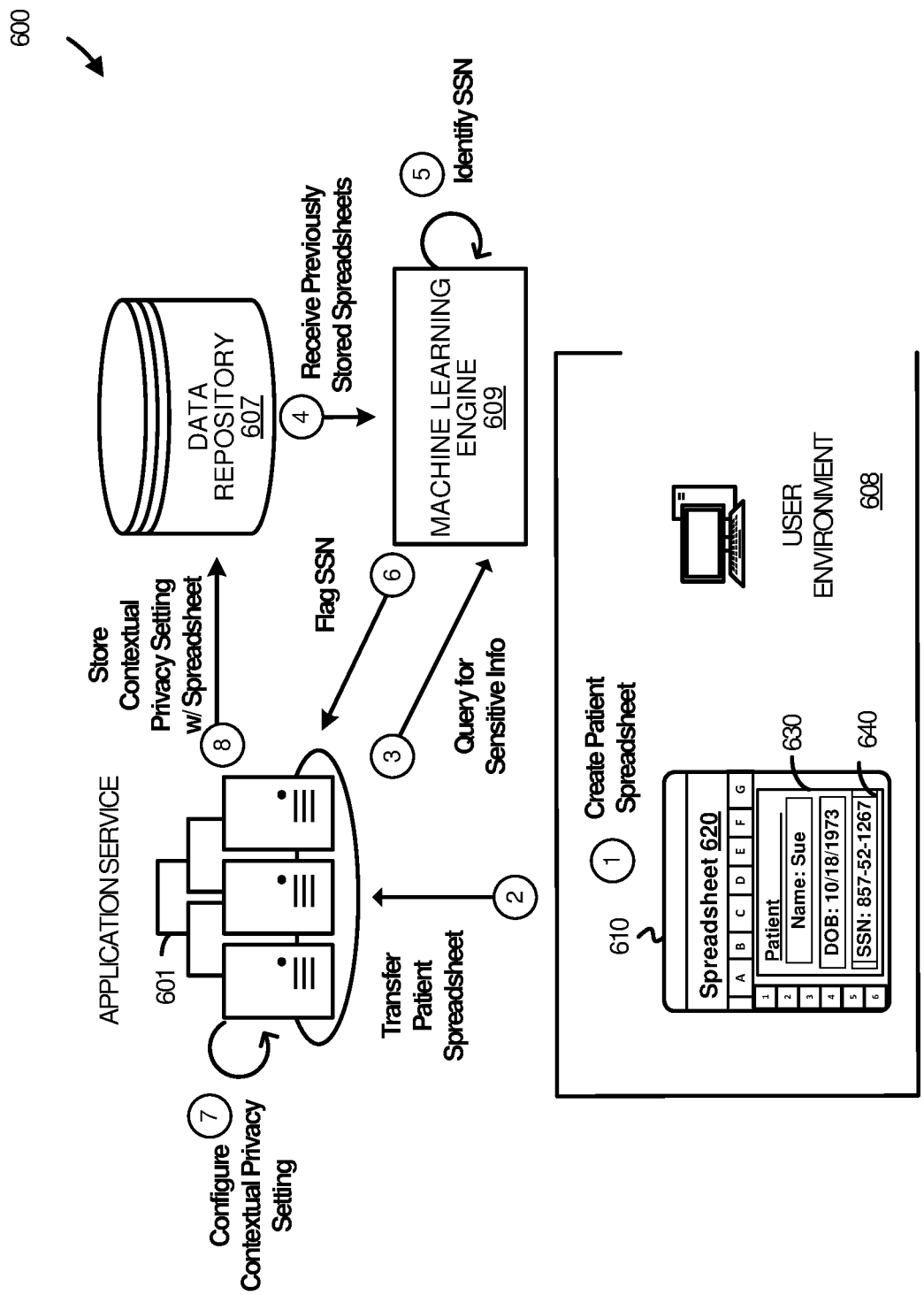
FIG. 6 illustrates an alternative operational architecture in an implementation of an enhanced application to reveal sensitive information included in text in accordance with a concealment level.

FIG. 6 illustrates an additional operational architecture for revealing sensitive information included in text in accordance with a concealment level that may be used in one or more scenarios of the present technology. FIG. 6 illustrates an operational scenario 600 that relates to what occurs when sensitive information is identified using machine learning techniques. Operational scenario 600 includes application service 601, user environment 608, user interface 610, data repository 607, and machine learning engine 609. Operational scenario 600 also includes spreadsheet 620, text 630, and sensitive information 640.

In a first operation, application service 601 receives user input comprising text 630 included in spreadsheet 620. In this example, spreadsheet 620 comprises text 630 indicating patient data. In a second operation, application service 601 examines text 630 in spreadsheet 620 for sensitive information 640. To examine text 630, spreadsheet 620 is transferred to application service 601. Application service 601 then queries machine learning engine 609 to identify sensitive information 640. In response to receiving the query, machine learning engine 609 retrieves previously stored spreadsheets stored in data repository 607 which have been marked to indicate previously identified sensitive information.

In a fifth operation, machine learning engine 609 processes the previously stored spreadsheets from data repository 607 and determines that a social security number is included in the patient data based on the formatting of the numbers included in the social security number. Therefore, in a sixth operation, application service 601 receives a flag indicating that sensitive information 640 comprises a social security number. In response, application service 601 configures a contextual privacy setting for sensitive information 640 in spreadsheet 620. In a final operation, application service 601 stores the contextual privacy setting in association with spreadsheet 620 comprising sensitive information 640.

Figure 7:
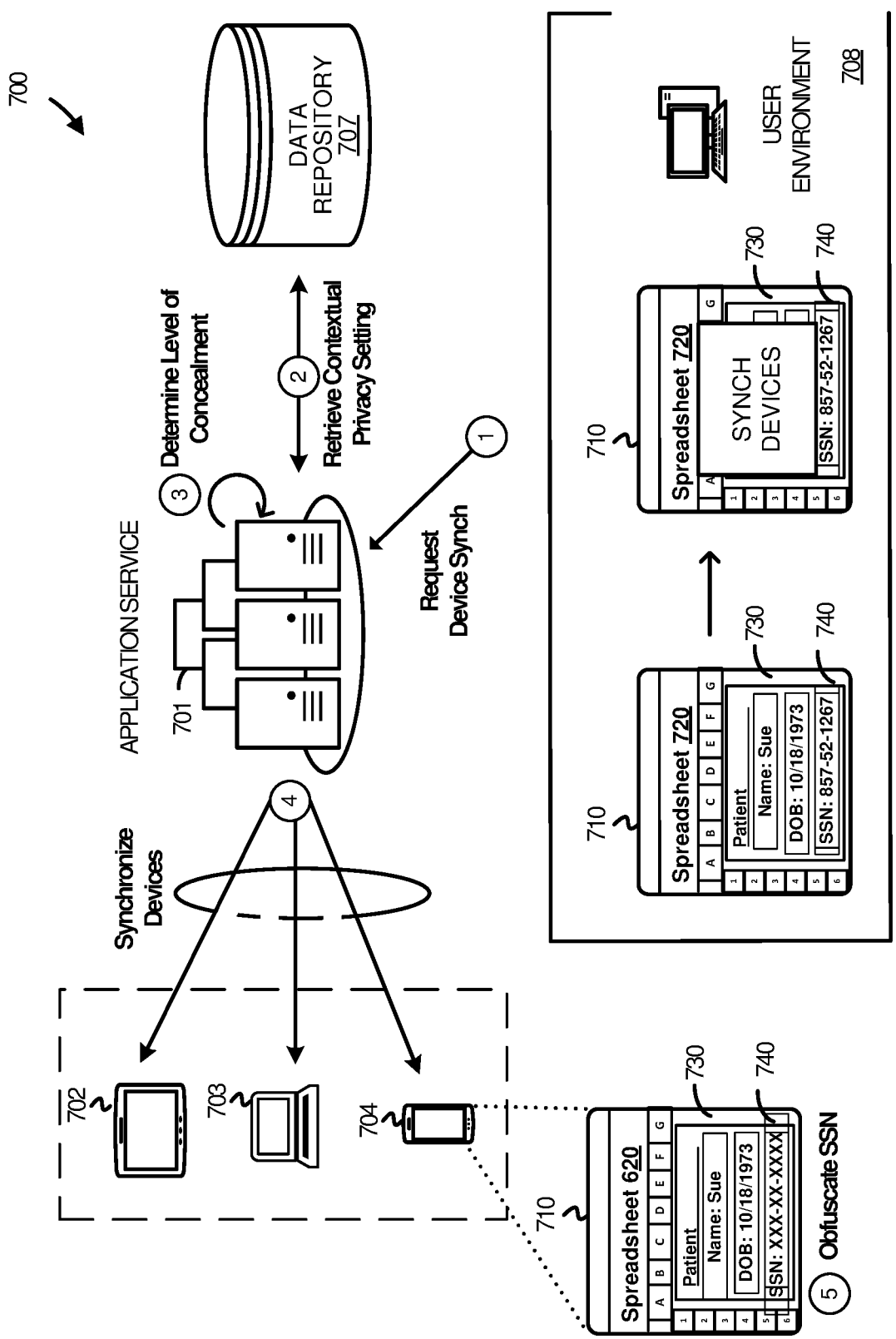
FIG. 7 illustrates an alternative operational architecture in an implementation of an enhanced application to reveal sensitive information included in text in accordance with a concealment level.

FIG. 7 illustrates an alternative operational architecture continued from FIG. 6 for revealing sensitive information included in text in accordance with a concealment level that may be used in one or more scenarios of the present technology. FIG. 7 illustrates an operational scenario 700 that relates to what occurs when a user synchronizes a version of a spreadsheet comprising user sensitive with other devices. Operational scenario 700 includes application service 701, user environment 708, user interface 710, data repository 707, and additional devices 702-704. Operational scenario 700 also includes spreadsheet 720, text 730, and sensitive information 740.

In a first operation, application service 701 identifies spreadsheet 720 comprising text 730 that includes sensitive information 740. In this example, application service 701 may identify spreadsheet 720 in response to receiving a request from the user in user environment 708 to synchronize the latest version of spreadsheet 720 with user devices 702-704. In a second operation, application service 701 identifies the contextual privacy setting for sensitive information 740 by querying data repository 707 and a context surrounding a presentation of spreadsheet 720. For example, application service 601 may determine that spreadsheet 720 is being synchronized with unsecured devices.

In response to identifying the contextual privacy setting for the sensitive information and the context surrounding the presentation of spreadsheet 720, application service 701 determines a level of concealment for sensitive information 740. In a fourth operation, application service 701 initiates the synchronization of user devices 702-704 with latest version of spreadsheet 720. In a final operation, spreadsheet 720 is presented by obfuscating sensitive information 740 (the social security number) when presenting text 730 included in spreadsheet 720 to a user of user device 704.

Figure 8:
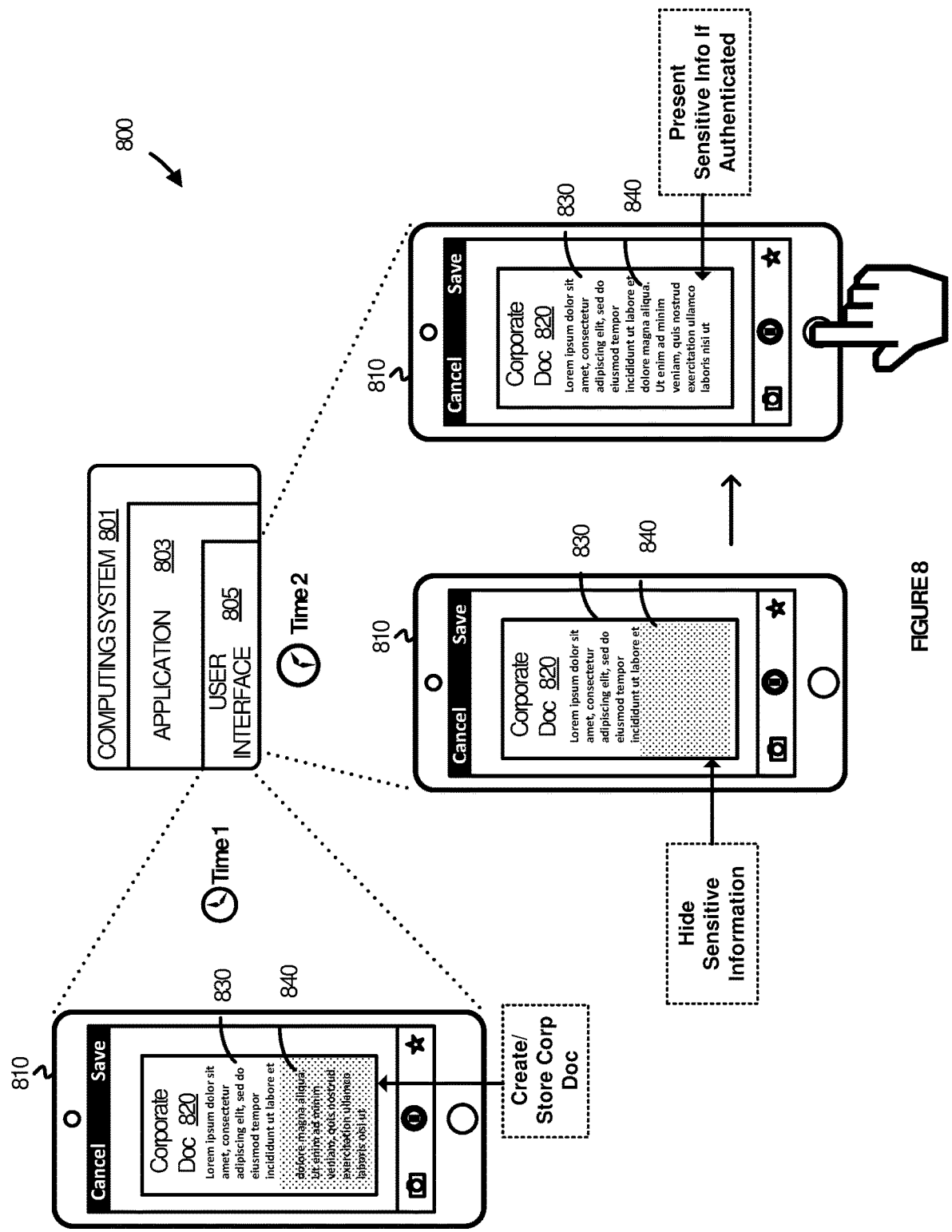
FIG. 8 illustrates an alternative operational architecture in an implementation of an enhanced application to reveal sensitive information included in text in accordance with a concealment level.

FIG. 8 illustrates an exemplary operational architecture for revealing sensitive information included in text in accordance with a concealment level that may be used in one or more scenarios of the present technology. FIG. 8 illustrates an operational scenario 800 that relates to what occurs when a corporate document comprising confidential information is opened using a secure method. Operational scenario 800 includes computing system 801, application 803, user interface 805, and visual representation 810. Operational scenario 800 also includes corporate document 820 which comprises text 830 which includes sensitive information 840.

In operation, at Time 1, application 803 receives user input comprising text 830 included in corporate document 820. In this example, corporate document 820 comprises text 830 indicating confidential company information 840. Application 803 then examines text 830 to identify confidential company information 840. In this example scenario, confidential company information 840 has been allocated as sensitive by the administrative department of the company. Confidential company information 840 may be identified as any sensitive by searching all employee communications and document sharing for a product name. All information associated with that product name would then by configured with a contextual privacy setting which will be used to later used in determining the level of concealment. In response, application 803 configures a contextual privacy setting for confidential company information 840 in corporate document 820. Once the contextual privacy setting has been configured, application 803 stores the contextual privacy setting in association with corporate document 820 comprising confidential company information 840.

In a next operation, at Time 2, application 803 identifies corporate document 820 comprising text 830 that includes confidential company information 840. In this example, application 803 may identify corporate document 820 in response to receiving a request from the user to view text 830 of corporate document 820 on user interface 805 of a mobile device. Next, application 803 identifies the contextual privacy setting for confidential company information 840 and a context surrounding a presentation of corporate document 820. For example, application 803 may determine that corporate document 820 is being opened using an authorized user fingerprint. Therefore, in response to identifying the contextual privacy setting for confidential company information 840 and the context surrounding the presentation of corporate document 820, application 803 determines a level of concealment for confidential company information 840. In a final operation, application 803 presents corporate document 820 on the screen of the mobile phone which was opened using the user's authorized fingerprint. In this scenario, confidential company information 840 is completely revealed along with text 830 since the level of concealment has been determined to be low in response to the determination of the authorized user accessing corporate document 820.

FIG. 9 illustrates computing system 901, which is representative of any system or visual representation of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes process 906, which is representative of the processes discussed with respect to the preceding FIGS. 1-8, including secure presentation process 200. When executed by processing system 902 to enhance an application, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, graphical processing unites, application specific processors, and logic devices, as well as any other type of processing device, combination, or variation.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. Software 905 may include program instructions for implementing presentation process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system to enhance application service for revealing sensitive information included in text in accordance with a concealment level. Indeed, encoding software 905 on storage system 903 may transform the physical structure of storage system 903. The specific transformation of the physical structure may depend on various factors in different implementations of this description. Such factors may include, but are not limited to, the technology used to implement the storage media of storage system 903 and whether the computer-storage media are characterized as primary or secondary storage, as well as other factors.

If the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here. User interface system 909 may also include associated user interface software executable by processing system 902 in support of the various user input and output devices discussed above.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel implementation.

Example 1. A computing apparatus comprising: one or more computer readable storage media; one or more processors operatively coupled with the one or more computer readable storage media; and program instructions stored on the one or more computer readable storage media that, when read and executed by the one or more processors, direct the one or more processors to at least: identify an object comprising text that includes sensitive information; identify a contextual privacy setting for the sensitive information; identify a context surrounding a presentation of the object; determine a level of concealment for the sensitive information in the text based on the contextual privacy setting and the context surrounding the presentation of the object; and present the object comprising the text, wherein the sensitive information included in the text is revealed in accordance with the level of concealment.

Example 2. The computing apparatus of Example 1 wherein the program instructions are further configured to: receive user input comprising the text; examine the text for the sensitive information; configure the contextual privacy setting for the sensitive information; and store the contextual privacy setting in association with the object comprising text that includes the sensitive information.

Example 3. The computing apparatus of Examples 1-2 wherein to examine the text for the sensitive information, the program instructions direct the one or more processors to identify one or more portions of the text based on at least one of a keyword, a symbol, a user indication, or a formatting style associated with the sensitive information.

Example 4. The computing apparatus of Examples 1-3 wherein to examine the text for the sensitive information the program instructions direct the one or more processors to track indicators associated with the sensitive information in a cloud-based data repository to be ingested by a machine learning system to identify the sensitive information.

Example 5. The computing apparatus of Examples 1-4 wherein to identify the context surrounding the presentation of the object, the program instructions direct the one or more processors to identify a request to share the object with at least one additional user device.

Example 6. The computing apparatus of Examples 1-5 wherein to identify the context surrounding the presentation of the object, the program instructions direct the one or more processors to identify a request to audibly present the object to the user.

Example 7. The computing apparatus of Examples 1-6 wherein to identify the context surrounding the presentation of the object, the program instructions direct the one or more processors to identify a request to access the object over a public network.

Example 8. The computing apparatus of Examples 1-7 wherein to identify the context surrounding the presentation of the object, the program instructions direct the one or more processors to determine a request to access the object using at least one of a user configured fingerprint, voice recognition, or facial recognition.

Example 9. The computing apparatus of Examples 1-8 wherein to present the sensitive information to the user in the user interface in accordance with the level of concealment, the program instructions direct the one or more processors to at least one of a blur the sensitive information, rearrange characters included in the sensitive information, obfuscate the sensitive information, use an alias representing the sensitive information, flip over of a digital content card including the sensitive information, or omit the sensitive information in accordance with the level of concealment.

Example 10. A method comprising: identifying an object comprising text that includes sensitive information; identifying a contextual privacy setting for the sensitive information; identifying a context surrounding a presentation of the object; determining a level of concealment for the sensitive information in the text based on the contextual privacy setting and the context surrounding the presentation of the object; and presenting the object comprising the text, wherein the sensitive information included in the text is revealed in accordance with the level of concealment.

Example 11. The method of Example 10 further comprising: receiving user input comprising the text; examining the text for the sensitive information; configuring the contextual privacy setting for the sensitive information; and storing the contextual privacy setting in association with the object comprising the text that includes the sensitive information.

Example 12. The method of Examples 10-11 wherein examining the text for the sensitive information comprises identifying one or more portions of the text based on at least one of a keyword, a symbol, a user indication, or a formatting style associated with the sensitive information.

Example 13. The method of Examples 10-12 wherein examining the text for the sensitive information comprises tracking indicators associated with sensitive information in a cloud-based data repository to be ingested by a machine learning system to identify the sensitive information.

Example 14. The method of Examples 10-13 wherein identifying the context surrounding the presentation of the object comprises identifying a request to share the object with at least one additional user device.

Example 15. The method of Examples 10-14 wherein identifying the context surrounding the presentation of the object comprises identifying a request to audibly present the object to the user.

Example 16. The method of Examples 10-15 wherein identifying the context surrounding the presentation of the object comprises identifying a request to access the object over a public network.

Example 17. The method of Examples 10-16 wherein to identify the context surrounding the presentation of the object, the program instructions direct the one or more processors to determine a request to access the object using at least one of a user configured fingerprint, voice recognition, or facial recognition.

Example 18. The method of Examples 10-17 wherein the sensitive information included in the text is revealed in accordance with the level of concealment by at least one of blurring the sensitive information, rearranging characters included in the sensitive information, obfuscating the sensitive information, using an alias representing the sensitive information, flipping over of a digital content card including the sensitive information, or omitting the sensitive information in accordance with the level of concealment.

Example 19. A computing apparatus comprising: one or more computer readable storage media; one or more processors operatively coupled with the one or more computer readable storage media; and program instructions stored on the one or more computer readable storage media that, when read and executed by the one or more processors, direct the one or more processors to at least: receive user input comprising text; examine the text for sensitive information; configure a contextual privacy setting for the sensitive information; and store the contextual privacy setting in association with an object comprising the text that includes the sensitive information.

Example 20. The computing apparatus of Example 20 wherein the program instructions are further configured to: identify the object comprising the text that includes the sensitive information; identify the contextual privacy setting for the sensitive information; identify a context surrounding a presentation of the object; determine a level of concealment for the sensitive information in the text based on the contextual privacy setting and the context surrounding the presentation of the object; and present the object comprising the text, wherein the sensitive information included in the text is revealed in accordance with the level of concealment.

What is claimed is:

1. A computing apparatus comprising:
one or more computer readable storage media;
one or more processors operatively coupled with the one or more computer readable storage media; and
program instructions stored on the one or more computer readable storage media that, when read and executed by the one or more processors, direct the one or more processors to at least:
identify an object comprising text that includes sensitive information;
identify contextual privacy settings for the sensitive information;
determine, based on environmental factors comprising a network type and a number of people proximate to a presentation of the object, whether a context surrounding the presentation of the object comprises one of at least a secure environment, an unsecure environment, and a semi-secure environment;

determine a level of concealment for the sensitive information in the text based on the contextual privacy settings and the context surrounding the presentation of the object; and present the object comprising the text, wherein the sensitive information included in the text is revealed in accordance with the level of concealment;

wherein the contextual privacy settings differ for different surrounding contexts; and wherein the level of concealment differs between at least two of the different surrounding contexts.

2. The computing apparatus of claim 1 wherein the program instructions are further configured to:

receive user input comprising the text;

examine the text for the sensitive information;

configure the contextual privacy settings for the sensitive information; and store the contextual privacy settings in association with the object comprising text that includes the sensitive information.

3. The computing apparatus of claim 2 wherein to examine the text for the sensitive information, the program instructions direct the one or more processors to identify one or more portions of the text based on at least one of a keyword, a symbol, a user indication, or a formatting style associated with the sensitive information, and wherein the environmental factors further comprise a presentation mode and an authentication type.

4. The computing apparatus of claim 2 wherein to examine the text for the sensitive information the program instructions direct the one or more processors to track indicators associated with the sensitive information in a cloud-based data repository to be ingested by a machine learning system to identify the sensitive information.

5. The computing apparatus of claim 1 wherein to identify the context surrounding the presentation of the object, the program instructions direct the one or more processors to identify a request to share the object with at least one additional user device.

6. The computing apparatus of claim 1 wherein to identify the context surrounding the presentation of the object, the program instructions direct the one or more processors to identify a request to audibly present the object.

7. The computing apparatus of claim 1 wherein to identify the context surrounding the presentation of the object, the program instructions direct the one or more processors to identify a request to access the object over a public network.

8. The computing apparatus of claim 1 wherein to identify the context surrounding the presentation of the object, the program instructions direct the one or more processors to determine a request to access the object using at least one of a user configured fingerprint, voice recognition, or facial recognition.

9. The computing apparatus of claim 1 wherein to present the object comprising the text, the program instructions direct the one or more processors to at least blur the sensitive information, rearrange characters included in the sensitive information, obfuscate the sensitive information, use an alias representing the sensitive information, flip over of a digital content card including the sensitive information, or omit the sensitive information in accordance with the level of concealment.

10. A method comprising:

identifying an object comprising text that includes sensitive information;

identifying contextual privacy settings for the sensitive information;

determine, based on environmental factors comprising a network type and a number of people proximate to a presentation of the object, whether a context surrounding the presentation of the object comprises one of at least a secure environment, an unsecure environment, and a semi-secure environment;

determining a level of concealment for the sensitive information in the text based on the contextual privacy settings and the context surrounding the presentation of the object; and presenting the object comprising the text, wherein the sensitive information included in the text is revealed in accordance with the level of concealment;

wherein the contextual privacy settings differ for different surrounding contexts; and wherein the level of concealment differs between at least two of the different surrounding contexts.

11. The method of claim 10 further comprising:

receiving user input comprising the text;

examining the text for the sensitive information;

configuring the contextual privacy settings for the sensitive information; and storing the contextual privacy settings in association with the object comprising the text that includes the sensitive information.

12. The method of claim 11 wherein examining the text for the sensitive information comprises identifying one or more portions of the text based on at least one of a keyword, a symbol, a user indication, or a formatting style associated with the sensitive information, and wherein the environmental factors further comprise a presentation mode and an authentication type.

13. The method of claim 11 wherein examining the text for the sensitive information comprises tracking indicators associated with sensitive information in a cloud-based data repository to be ingested by a machine learning system to identify the sensitive information.

14. The method of claim 10 wherein identifying the context surrounding the presentation of the object comprises identifying a request to share the object with at least one additional user device.

15. The method of claim 10 wherein identifying the context surrounding the presentation of the object comprises identifying a request to audibly present the object.

16. The method of claim 10 wherein identifying the context surrounding the presentation of the object comprises identifying a request to access the object over a public network.

17. The method of claim 10 wherein identifying the context surrounding the presentation of the object comprises determining a request to access the object using at least one of a user configured fingerprint, voice recognition, or facial recognition.

18. The method of claim 10 wherein the sensitive information included in the text is revealed in accordance with the level of concealment by at least one of blurring the sensitive information, rearranging characters included in the sensitive information, obfuscating the sensitive information, using an alias representing the sensitive information, flipping over of a digital content card including the sensitive information, or omitting the sensitive information in accordance with the level of concealment.

19. One or more computer readable storage media having program instructions stored thereon that, when read and executed by one or more processors in a computing device, direct the computing device to at least:
    identify an object comprising text that includes sensitive information;
    identify contextual privacy settings for the sensitive information;
    determine, based on environmental factors comprising a network type and a number of people proximate to a presentation of the object, whether a context surrounding the presentation of the object comprises one of at least a secure environment, an unsecure environment, and a semi-secure environment;
    determine a level of concealment for the sensitive information in the text based on the contextual privacy settings and the context surrounding the presentation of the object; and
    present the object comprising the text, wherein the sensitive information included in the text is revealed in accordance with the level of concealment;
    wherein the contextual privacy settings differ for different surrounding contexts; and
    wherein the level of concealment differs between at least two of the different surrounding contexts.

20. The one or more computer readable storage media of claim 19 wherein the environmental factors further comprise a presentation mode and an authentication type.

* * * * *